United States Patent
James et al.

(10) Patent No.: US 8,936,081 B2
(45) Date of Patent: Jan. 20, 2015

(54) COMPOSITIONS AND METHODS FOR SERVICING SUBTERRANEAN WELLS

(75) Inventors: Simon James, Le Plessis-Robinson (FR); Michel Michaux, Verrieres-le-Buisson (FR); Clara Carelli, Paris (FR); Sylvaine Le Roy-Delage, Paris (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 107 days.

(21) Appl. No.: 12/420,860

(22) Filed: Apr. 9, 2009

(65) Prior Publication Data

US 2010/0258310 A1 Oct. 14, 2010

(51) Int. Cl.
*E21B 29/00* (2006.01)
*E21B 33/13* (2006.01)
*C09K 8/42* (2006.01)
*E21B 33/138* (2006.01)
*C04B 28/18* (2006.01)

(52) U.S. Cl.
CPC .............. *C09K 8/428* (2013.01); *E21B 33/138* (2013.01); *C04B 28/18* (2013.01)
USPC .......................... 166/277; 166/292; 166/300

(58) Field of Classification Search
USPC ......... 166/277, 279, 285, 292, 293, 294, 300, 166/305.1
See application file for complete search history.

(56) References Cited

U.S. PATENT DOCUMENTS

| | | | | |
|---|---|---|---|---|
| 3,899,026 A | * | 8/1975 | Culter | 166/302 |
| 4,505,751 A | * | 3/1985 | Sydansk | 166/292 |
| 4,588,443 A | * | 5/1986 | Bache | 106/644 |
| 5,168,928 A | * | 12/1992 | Terry et al. | 166/292 |
| 5,195,588 A | | 3/1993 | Dave | |
| 5,501,277 A | | 3/1996 | Onan et al. | |
| 6,271,181 B1 | * | 8/2001 | Chatterji et al. | 507/219 |
| 6,328,106 B1 | * | 12/2001 | Griffith et al. | 166/295 |
| 6,401,817 B1 | * | 6/2002 | Griffith et al. | 166/295 |
| 6,715,553 B2 | * | 4/2004 | Reddy et al. | 166/309 |
| 6,964,302 B2 | * | 11/2005 | Luke et al. | 166/293 |
| 7,163,358 B2 | * | 1/2007 | Greenwood et al. | 405/266 |
| 7,267,174 B2 | * | 9/2007 | Gonsveld et al. | 166/293 |
| 7,363,976 B1 | * | 4/2008 | Burts et al. | 166/289 |
| 2005/0098315 A1 | | 5/2005 | Danican et al. | |
| 2008/0020961 A1 | * | 1/2008 | Rodrigues et al. | 510/475 |
| 2008/0039347 A1 | * | 2/2008 | Welton et al. | 507/213 |
| 2008/0236814 A1 | * | 10/2008 | Roddy | 166/250.01 |

(Continued)

FOREIGN PATENT DOCUMENTS

| | | |
|---|---|---|
| EP | 0605257 | 7/1994 |
| EP | 1686234 | 8/2006 |

(Continued)

OTHER PUBLICATIONS

Office action for the equivalent Russian patent application No. 2011145307 issued on May 19, 2014.

*Primary Examiner* — Catherine Loikith (74) *Attorney, Agent, or Firm* — Michael Dae (57) ABSTRACT

Fluid compositions containing a silica-particle suspension with no intrinsic cementitious properties may be pumped into a wellbore. Upon making downhole contact with previously placed well cements from primary-cementing or previous remedial-cementing operations, the silica suspension reacts to form a gel that seals voids, cracks or fissures in the cement sheath. Portland cement is the preferred cement with which the silica-particle suspensions interact downhole.

10 Claims, 10 Drawing Sheets

(56) References Cited

U.S. PATENT DOCUMENTS

2009/0038800 A1* 2/2009 Ravi et al. ............... 166/292
2009/0038801 A1* 2/2009 Ravi et al. ............... 166/293
2009/0056946 A1* 3/2009 Burts et al. .............. 166/292

FOREIGN PATENT DOCUMENTS

| RU | 2154159 | 8/2000 |
| WO | 2005/045186 | 5/2005 |
| WO | 2007/008187 | 1/2007 |

* cited by examiner

COMPOSITIONS AND METHODS FOR SERVICING SUBTERRANEAN WELLS

BACKGROUND OF THE INVENTION

The statements in this section merely provide background information related to the present disclosure and may not constitute prior art.

This invention relates to methods for servicing subterranean wells, in particular, fluid compositions and methods for remedial operations during which the fluid compositions are pumped into a wellbore and make contact with well cements placed during primary cementing or previous remedial cementing operations.

During construction of a subterranean well, remedial operations may be required to maintain wellbore integrity during drilling, to cure drilling problems, or to repair defective primary cement jobs. Wellbore integrity may be compromised when drilling through mechanically weak formations, leading to hole enlargement. Cement slurries may be used to seal and consolidate the borehole walls. Remedial cementing is a common way to repair defective primary cement jobs, to either allow further drilling or to provide adequate zonal isolation for efficient well production.

During well production, remedial cementing operations may be performed to restore production, change production characteristics (e.g., to alter the gas/oil ratio or control water production), or repair corroded tubulars.

During a stimulation treatment, the treatment fluids must enter the target zones and not leak behind the casing. If poor zonal isolation behind the production casing is suspected, a remedial cementing treatment may be necessary.

Well abandonment frequently involves placing cement plugs to ensure long-term zonal isolation between geological formations, replicating the previous natural barriers between zones. However, before a well can be abandoned, annular leaks must be sealed. Squeeze cementing techniques may be applied for this purpose.

Common cementitious-fluid systems employed during squeeze-cementing operations include, Portland cement slurries, calcium-aluminate cement slurries, and organic resins based on epoxies or furans.

Portland cement slurries prepared from, for example, ISO/API Class H or Class G cement, are by far the most common cementitious fluids employed in remedial cementing operations. They perform satisfactorily in many applications; however, when the size of the void from which fluid leakage occurs is very small, the cement-particle size may be too large to enter and seal the void. This problem has been mitigated to a significant extent by grinding Portland cement clinker to a finer particle-size distribution. An example of a fine-particle-size, or microfine, Portland cement system is Squeeze-CRETE™, available from Schlumberger. Generally, SqueezeCRETE systems are capable of sealing voids or cracks as small as about 100 micrometers.

Despite the success of microfine cements, leaks may still occur when the voids or cracks in the cement sheath are smaller than 100 micrometers. It is therefore desirable to provide means to seal such small voids and cracks in or adjacent to the cement sheath and provide zonal isolation.

SUMMARY OF THE INVENTION

The present invention provides means to seal voids and cracks in or adjacent to a cement sheath in a subterranean well, and provide zonal isolation by involving a pumpable sealant composition for establishing hydraulic isolation in a cemented subterranean well, comprising a silica-particle suspension with no cementitious properties in and of itself.

In a first aspect, the present invention discloses pumpable sealant compositions with the ability to enter and seal cement-sheath voids and cracks smaller than 100 micrometers. It will be appreciated that, although the primary focus is to seal preferably voids and cracks smaller than 100 micrometers, the invention is not limited to this size criterion.

The sealant compositions preferably comprise suspensions of silica particles with an average particle size ($d_{50}$) less than or equal to 1 micrometer. Said suspensions comprise colloidal silica, silica fume, or both, and are not cementitious in and of themselves. However, upon entering voids and cracks in or adjacent to the cement sheath and contacting the set-cement surfaces, the silica suspension reacts and forms by gelation a seal that prevents further leakage. The gelation rate may be controlled by pumping a spacer ahead of the silica suspension. The spacer may contain for example a pH buffer, soluble salts, multivalent-ion sequestering agents, or combinations thereof. The silica-suspension may also contain a pH buffer, soluble salts, multivalent-ion sequestering agents, or combinations thereof.

In another aspect, the present invention aims at a method of servicing a cemented wellbore in contact with a subterranean formation, comprising pumping a sealant composition comprising a silica-particle suspension with no cementitious properties in and of itself into voids in or adjacent to a damaged cement sheath, and allowing the sealant to react with set cement to form a seal. Said method for servicing a subterranean well preferably comprising preparing a pumpable aqueous silica-particle suspension containing particles with an average size ($d_{50}$) smaller than 1 micrometer, pumping the suspension into a subterranean well, and allowing the suspension to flow into voids and cracks in, or adjacent to, the cement sheath until the suspension reacts and forms a seal. The method may further comprise pumping a spacer fluid ahead of the silica suspension, the spacer fluid comprising a pH buffer, soluble salts, multivalent-ion sequestering agents, or combinations thereof.

BRIEF DESCRIPTION OF THE DRAWINGS

For a more complete understanding of the present invention, and the advantages thereof, reference is now made to the following descriptions taken in conjunction with the accompanying figures.

DETAILED DESCRIPTION

At the outset, it should be noted that in the development of any such actual embodiment, numerous implementation-specific decisions must be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein may also comprise some components other than those cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possessed knowledge of the entire range and all points within the range.

The inventors have surprisingly found that suspensions of silica particles less than about one micrometer in size will, upon entering voids or cracks that are in contact with Portland cement, gel and form a seal. It will be appreciated that, unlike Portland cement slurries, the silica suspensions have no cementitious properties in and of themselves. Instead, the silica particles respond to the set-Portland-cement surface and coagulate or form a gel. Without being bound by any theory, it is believed that with time, the silica particles react with residual calcium hydroxide in the set Portland cement to form calcium silicate hydrate gel, further reinforcing the seal. Set Portland cement contains roughly 20 wt % calcium hydroxide when cured below 110° C. At higher temperatures, calcium silicate hydrate gel reacts with and consumes the residual calcium silicate hydrate to form other calcium silicate hydrate minerals such as alpha-dicalcium silicate hydrate, tobermorite, xonotlite and truscottite.

It will be appreciated that the silica suspensions may respond to other cements that provide multivalent ions including, but not limited to, lime/silica blends, lime/pozzolan blends, calcium aluminate cement, Sorel cement, chemically bonded phosphate ceramics and geopolymers.

The silica-particle suspensions may be, but are not limited to, silica-fume suspensions, colloidal-silica suspensions or both. A typical silica-fume suspension is MICROBLOK from Elkem. Sources of colloidal-silica suspensions include LUDOX products from Grace Davison, BINDZIL products from Akzo Nobel, NEXSIL and NYACOL products from Nyacol Nano Technologies, Inc. and KOSTROSOL and KOSTROSORB products from Chemiwerk Bad Kostritz.

The rate at which, or the degree to which, silica-suspension gelation occurs may be modified by adjusting the chemical environment. This is illustrated in the textbook entitled *The Chemistry of Silica* by R. K. Iler, John Wiley & Sons (1979), which is incorporated by reference herein in its entirety. Inspection of FIG. 4.13 in said textbook shows that adjusting the pH, adding electrolytes and adding water-miscible organic liquids affects the gelation behavior of colloidal-silica suspensions. Lowering the pH will generally slow down gelation, and this may be accomplished by pumping a low-pH spacer ahead of the silica suspension or adding a buffer to the silica suspension. Water miscible organic liquids such as alcohols also retard gelling. On the other hand, adding electrolytes such as sodium chloride generally accelerates gelation.

The reaction between the silica particles and calcium hydroxide to form calcium silicate hydrate gel may be controlled by adding multivalent-cation sequestering agents. Reducing the availability of calcium ions will retard the reaction. The inventors envision adding chelating agents based on ethylenediaminetetraacetic acid (EDTA), diethylenetriaminepentaacetic acid (DTPA), hydroxyethyl-ethylenediaminetriacetic acid (HEDTA), hydroxyethyliminodiacetic acid (HEIDA) and triethanolamine. It will be appreciated that this list is not exhaustive, and the present invention is not limited to amine-base chelating agents.

It will also be appreciated that the silica suspensions may also contain additional materials with average particle sizes ($d_{50}$) less than or equal to one-micrometer. Such materials include, but are not limited to, latexes, titanium dioxide and manganese tetraoxide.

The present invention also encompasses a method for servicing a subterranean well comprising pumping a one or more of the silica-particle suspensions described earlier into a subterranean well that has been cemented. The silica-particle suspension enters voids, cracks or both into or adjacent to the cement sheath. The silica particles react with the cement sheath, form a seal and establish hydraulic isolation. The placement method may further comprise controlling the rate at which the silica particles react with the set cement to form a seal—by pumping an acidic spacer fluid ahead of the silica suspension, including an acidic buffer in the silica suspension, including multivalent-cation sequestering agents in the silica suspension, or a combination thereof.

The placement method may incorporate a variety of remedial techniques known to those skilled in the art, and coiled tubing may be used to convey the suspensions into the well. Another placement method involves the Cased Hole Dynamics Tester (CHDT), available from Schlumberger, and described in U.S. Pat. No. 5,195,588 and Schlumberger Publication FE_03_002_2, "CHDT Cased Hole Dynamics Tester," June 2003. The CHDT tool is normally used to extract formation-fluid samples from the subterranean well and also to perform pressure tests. Rather than using the CHDT for fluid extraction, the inventors envision the opposite—using the tool to inject the silica suspensions. Since the silica suspensions are not cementitious in and of themselves, there is, indeed, little danger of plugging the tool.

The following examples serve to further illustrate the invention. The materials used in the examples are commonly available and used in the well cementing industry.

EXAMPLE 1

Figure 1:
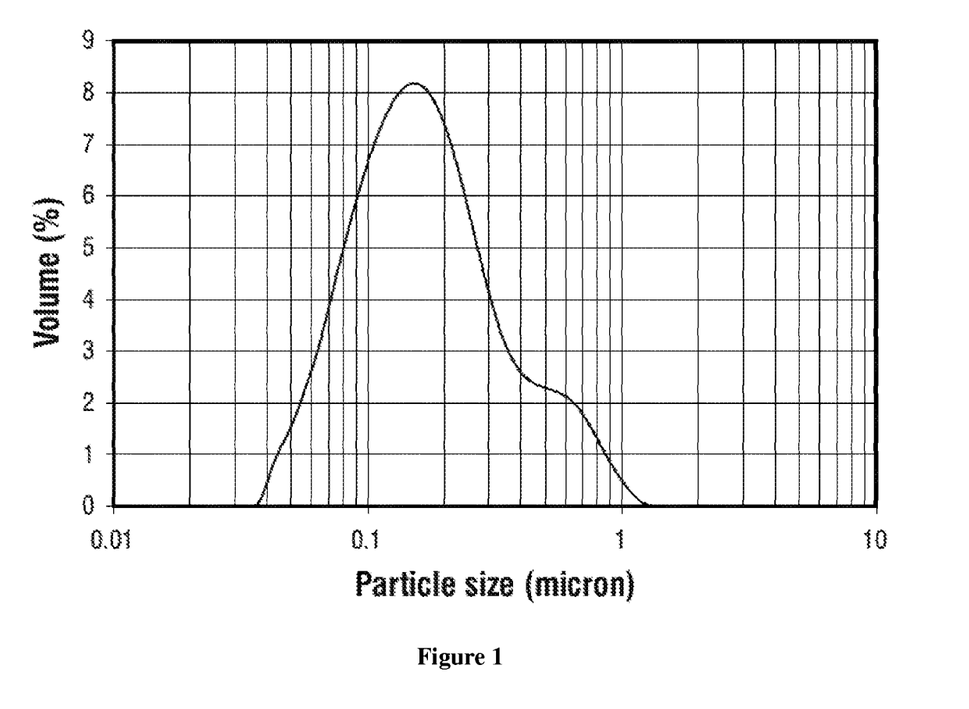
FIG. 1 is a plot showing the particle-size distribution of a silica-fume suspension as employed in the examples.

Small plastic containers were filled with 6.5 g (4.6 mL) of a 50 wt % suspension of fumed silica. The particle-size distribution of the fumed silica is shown in FIG. 1. Three solutions were prepared as follows.
1. Ca(OH)$_2$ at a concentration of 0.019 mol/L: pH=11.5
2. CaCl$_2$ at a concentration of 0.022 mol/L: pH=5
3. NaOH at a concentration of 0.033 mol/L: pH=11.5

The concentration of Ca(OH)$_2$ in solution was below the solubility limit of calcium hydroxide.

1 mL and 2 mL of the calcium hydroxide solution were added to two separate containers of fumed-silica suspension, stirred gently and left overnight. 2 mL of the calcium chloride solution and 2 mL of the sodium hydroxide solution were added to the third and fourth containers of fumed-silica suspension, stirred gently and left overnight. The following day the fumed-silica suspension containing 2 mL calcium hydroxide solution had gelled strongly. The fumed-silica suspension containing NaOH solution had partially gelled while the two other solutions were still fluid. These results indicate that both multivalent ions and increased pH are required to cause the silica-fume suspensions to gel.

EXAMPLE 2

Small plastic containers were filled with 20 g of colloidal silica (Kostrosol 0830 from Chemiewerk Bad Kostriz; particle size: 8 nm; concentration: 30 wt %). Three solutions were prepared as follows.
1. MgCl$_2$ at a concentration of 0.019 mol/L: pH=11.5
2. FeCl$_3$ at a concentration of 0.022 mol/L: pH=5
3. NaCl at a concentration of 0.033 mol/L: pH=11.5

The different brine solutions were added stepwise (approximately 0.5 g at a time) into the colloidal silica and mixture shaken. The amounts of solution required to form a highly viscous mass was measured and are noted below.

MgCl$_2$: 1.3 g of solution, corresponding to 0.001 mole.
FeCl$_3$: 1.6 g of solution, corresponding to 0.003 mole.
NaCl: 2.4 g of solution, corresponding to 0.008 mole.

The sodium chloride solution did not immediately cause a significant increase in viscosity; rather, a gel formed after the mixture was left overnight. The magnesium and iron brines tended to coagulate the mixtures instead of gelling them. However, all would be suitable for plugging small fissures because no syneresis occurred.

EXAMPLE 3

A calcium chloride solution was prepared at a concentration of 0.5 moles/L. The solution pH was 5.0. 2 g of the calcium-chloride solution were added to 20 g of silica-fume suspension (described in Example 1), and the mixture formed a gel within a few minutes. The gel could be broken by shaking. A similar test involving 20 g of colloidal silica (described in Example 2) generated a coagulated system that would not flow.

EXAMPLE 4

Set Portland cement contains roughly 20 wt % calcium hydroxide when cured at temperatures below about 110° C. When a suspension of fine silica particles is placed in contact with a cement surface the pH of the solution increases and a strong gel is formed. The initial pH of the 50 wt % fumed-silica suspension is 5 to 6.5. A piece of set Portland cement was placed in a small container and the fumed-silica suspension was poured around the cement. The container was closed and left at ambient temperature for 72 hours. On examination the silica suspension had formed a very strong gel.

EXAMPLE 5

Figure 2A:
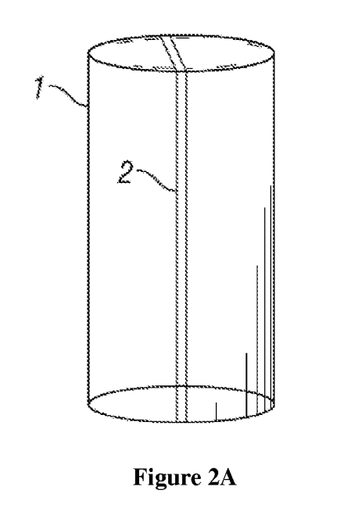
FIG. 2A, 2B and 2C are a series of drawings that illustrates the steps of a laboratory method of preparing set-cement samples with fissures less than 100 micrometers in size.
Figure 2B:
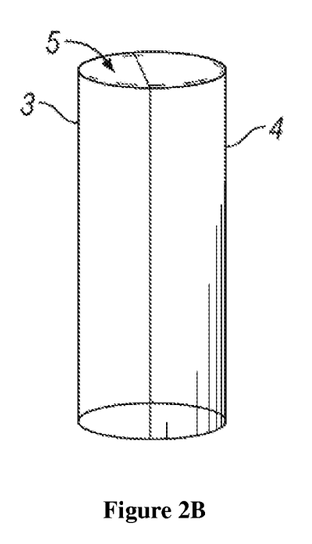
Figure 2C:
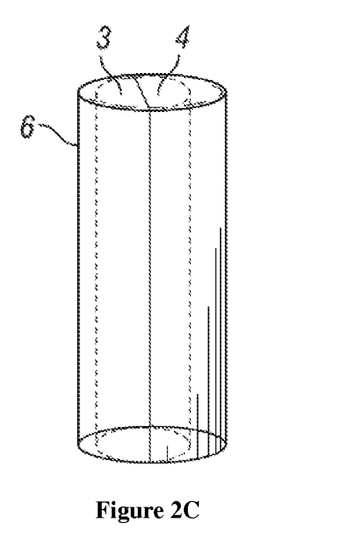

Tests were prepared to simulate a fissure in a cement sheath to evaluate the effectiveness of the silica suspension in blocking small fissures. FIG. 2 shows a diagram of the sample preparation. A conventional 1890 kg/m$^3$ ISO/API Class G cement system was prepared and cured for 3 days at 60° C. in a cylindrical mold. A 37-mm diameter cylinder 1 was then cored from the mold and subsequently cut lengthwise (FIG. 2A). The width of the saw cut 2 was approximately 2 mm. The two half cylinders (3 and 4) were then placed with their flat faces together (FIG. 2B). The missing width due to the saw cut caused a non-circular cross section 5. The assembly of FIG. 1B was embedded in plaster to firmly hold the two pieces together. Once the plaster set, a 25-mm diameter core plug 6 was cut from the sample such that the split was in the middle of the resultant core and the cross section of the 25-mm diameter core was perfectly circular (FIG. 2C), i.e., there was no "missing" part due to a saw cut. Several samples were prepared this way with lengths between 5-7 cm.

Figure 3:
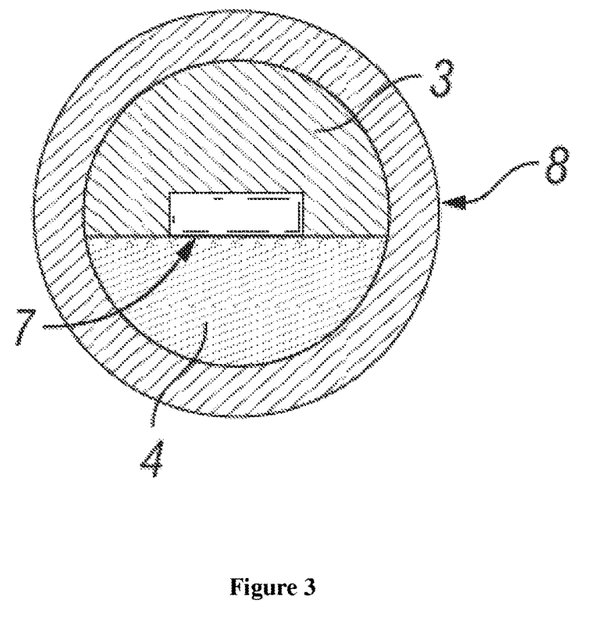
FIG. 3 is a cross-sectional drawing that depicts sample preparation prior to the introduction of the silica suspension.

A small slot 7 is then filed into one flat face of one of the cylinders to provide a channel the length of the sample (FIG. 3). The assembly is then inserted in the rubber sleeve 8 of a Hassler cell.

Figure 4:
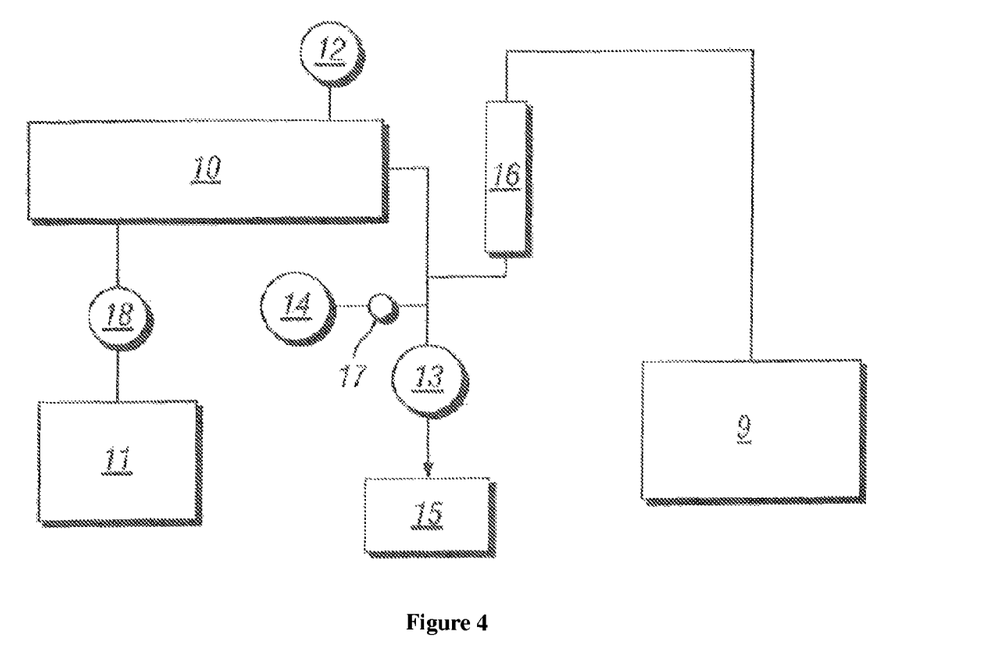
FIG. 4 is a schematic diagram of the apparatus employed to monitor the behavior of silica suspensions injected into simulated cracks in the set-cement samples.

FIG. 4 shows the equipment setup for the experiment. The pump 9 is a Pharmacia model P-500 HPLC pump. The Hassler cell 10 is from Temco model DCH0-1.0, with a working pressure of 34 MPa. The confining-pressure pump 11 is an Ametek Portable Hydraulic Pressure Tester, Model T620. A pressure-relief device 18 is installed between the Hassler cell and the confining-pressure pump. An analog pressure gauge 12 indicates the confining pressure. Validyne pressure transducers (13 and 14) with CD23 signal conditioners are connected to a Kipp and Zonen chart recorder 15. Pressure transducer 14 is a 25-psi full-scale transducer that can be isolated from the system by a valve 17 as pressures increase. Transducer 13 is a 200-psi pressure transducer. The pressure transducers were calibrated against an Ametek Jofra Instruments PPCE pressure calibrator. The displacement cylinder 16 (no reference) was used so that the silica suspension would not be pumped through the HPLC pump. When required the cylinder was filled with silica suspension and water pumped into the top by the HPLC pump to displace the silica suspension through the cement sample. The cylinder was bypassed when pumping water only. There would be a little dilution of the silica suspension at the top silica suspension/water interface, but the cylinder was never completely emptied so the dilution did not affect the results.

The test procedure consisted of loading of the test sample into cell, applying 3 MPa confining pressure, flowing water at different rates and measuring pressures; isolating pressure transducer P3 if necessary, adding the silica suspension to the displacement cylinder and starting to pump through the core, monitoring the pressure, stopping pumping for a given time, restarting pumping and determining the maximum pressure obtained.

Initially, water was flowed through the channel to determine the effective channel width using the equation for flow of a Newtonian fluid through a slot.

$$s = \sqrt[3]{\frac{12\,\mu L Q}{\Delta P w}} \qquad \text{Equation 1}$$

where: s is the channel height (m); µ is the fluid viscosity (Pa·s); L is the length of the channel (m); Q is the flow rate (m³/s); ΔP is the pressure drop across the sample (Pa); w is the width of the channel (m).

Before pumping the silica suspension, the average width of the engraved channel was measured and the average channel height was calculated from Eq. 1 using the water-flow measurements shown in Table 1.

TABLE 1

Calculated slot height from water-flow measurements.
Slot length = 60.7 mm, slot width = 8.5 mm.

| Flow rate (mL/hr) | Pressure (psi) | Calculated slot height (µm) from Eq. 1 |
|---|---|---|
| 400 | 8.6 | 56 |
| 300 | 6.3 | 57 |
| 200 | 3.9 | 58 |
| 100 | 1.4 | 65 |

Figure 5:
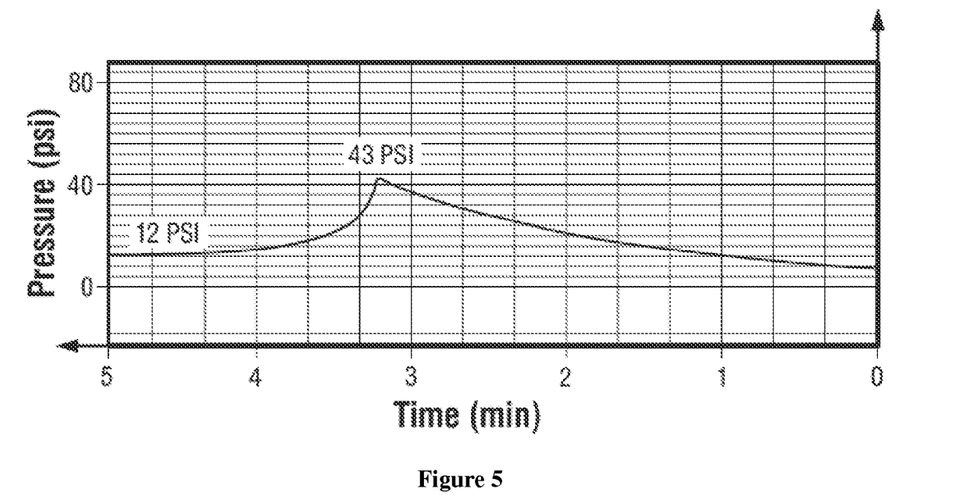
FIG. 5 is a pressure-versus-time plot during the injection of a silica-fume suspension at early times (from 4 minutes after injection begins).
Figure 6:
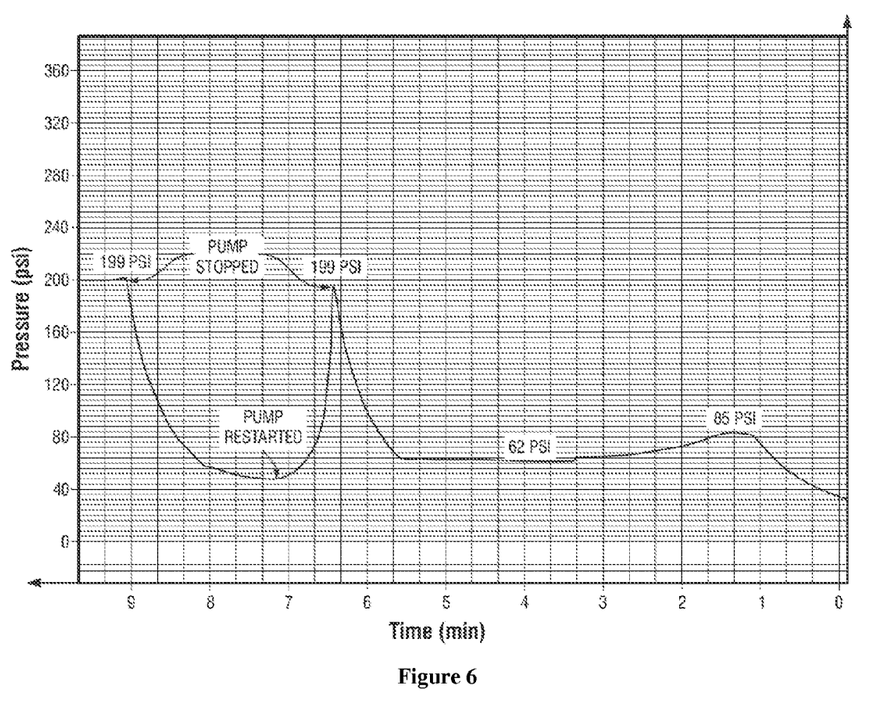
FIG. 6 is a pressure-versus-time plot during the injection of a silica-fume suspension at later times (from 11.5 minutes after injection begins).

50 wt % fumed-silica suspension was then injected into the slot at a rate of 100 mL/hr. Initially, the injection pressure increased to 43 psi and then the pressure decreased as the gel broke (FIG. 5) to a minimum of 12 psi. The gel built up to 85 psi and then decreased to 62 psi before building up to the maximum of 199 psi. The pump was stopped and the pressure decreased. Injection was restarted and the injection pressure increased to 199 psi and the injection stopped (FIG. 6). At this point the pressure decrease was very slow showing that the silica-fume suspension had blocked the fissure and could withstand a high differential pressure—approximately 200 psi over a length of less than 3 inches.

EXAMPLE 6

A test similar to that described in Example 5 was performed, this time with a colloidal-silica suspension, containing 30 wt % silica particles with a size≈8 nm. The surface area of the silica particles varies from 260-330 m²/g. The channel height obtained from water-flow measurements is shown in Table 2.

TABLE 2

Calculated slot height from water-flow measurements.
Slot length = 48.6 mm, slot width = 8.6 mm.

| Flow rate (mL/hr) | Pressure (psi) | Calculated slot height (µm) from Eq. 1 |
|---|---|---|
| 300 | 8.6 | 55 |
| 200 | 2.8 | 58 |
| 100 | 0.8 | 70 |

Figure 7:
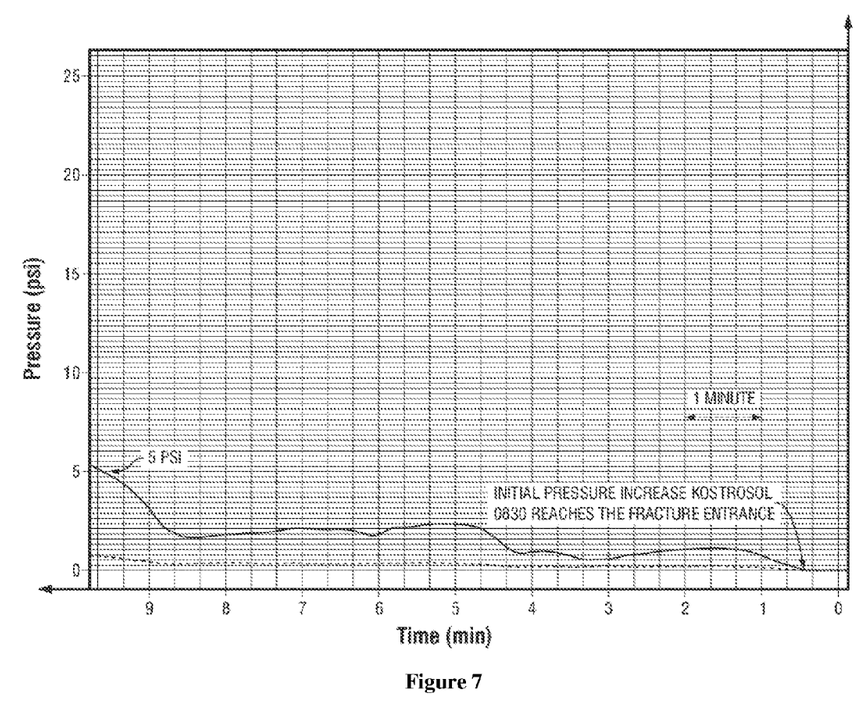
FIG. 7 is a pressure-versus-time plot during the injection of colloidal silica.

The colloidal-silica suspension was injected into the slot at 100 mL/hr, and, as shown in FIG. 7, the pressure increased during the first 10 minutes of pumping. During this time there was some indication an viscosity increase of colloidal-silica suspension as evidenced by the slight pressure increase. During injection a maximum pressure of 12 psi was attained after 20 minutes. This is lower than the pressure measured during the injection of the silica-fume suspension (Example 5). The injection was stopped and the system left to rest for 18 hours. The injection pump was restarted at 100 mL/hr and the injection pressure rapidly reached 180 psi. The pump was stopped and the system left for 4 hours for the pressure to decay. The pump was subsequently restarted at 25 mL/hr and again the pressure rapidly reached 180 psi, and the pump was stopped.

EXAMPLE 7

Figure 8:
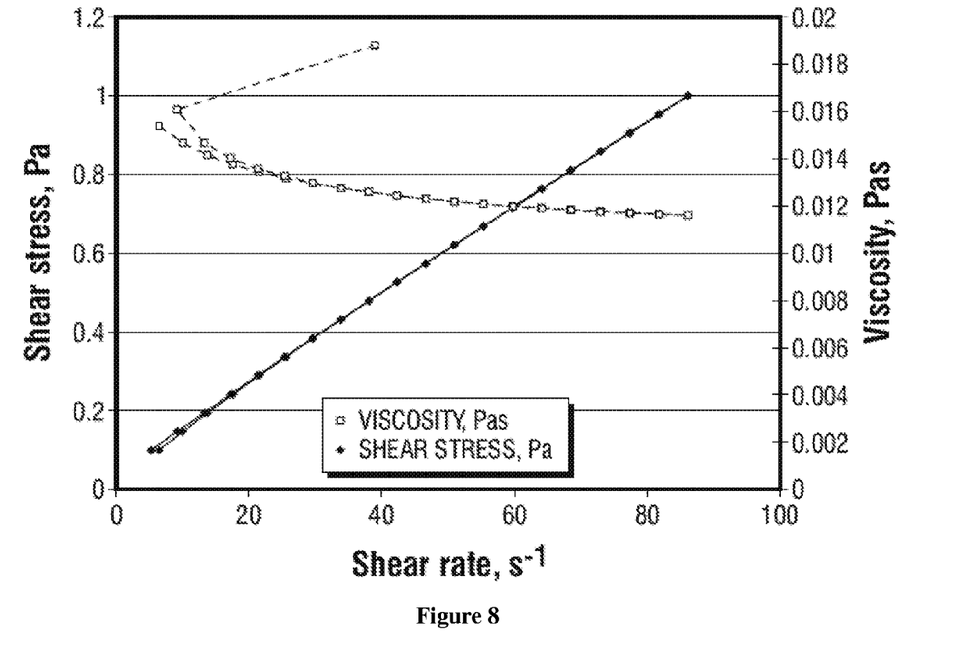
FIG. 8 is a shear-stress plot depicting the rheological behavior of a silica-fume suspension in water.

The rheological behavior of a 50 wt % silica-fume suspension when exposed to calcium hydroxide was measured. The viscosity of the neat suspension was measured at ambient temperature using a Bohlin controlled-stress rheometer fitted with a concentric cylinder measurement geometry. FIG. 8 is a shear-rate/shear-stress plot that shows the baseline behavior of the suspension. The suspension is slightly non-Newtonian, with a viscosity increasing from 12 to 16 mPa·s as the shear rate decreases from 90 to 9 s$^{-1}$.

Figure 9:
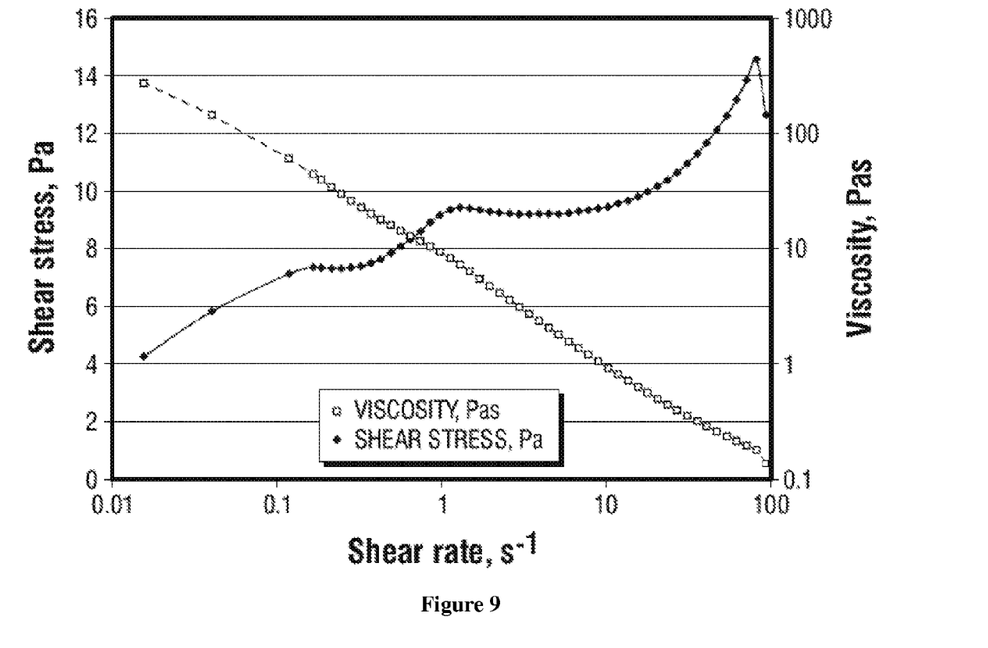
FIG. 9 is a shear-stress plot depicting the effect of calcium hydroxide on the rheological behavior of a silica-fume suspension in water.

To simulate what occurs when the silica-fume suspension is exposed to set Portland cement, 0.019M calcium hydroxide solution was added at a concentration of 2 mL calcium-hydroxide solution to 6.5 g of silica-fume suspension. A shear-rate/shear-stress plot was generated at ambient temperature as the shear rate was ramped from 100 s$^{-1}$ to 0.01 s$^{-1}$. As shown in FIG. 9, the fluid is shear thinning and the low-shear viscosity is higher. Note that, unlike FIG. 8, the shear-rate scale is logarithmic.

Figure 10:
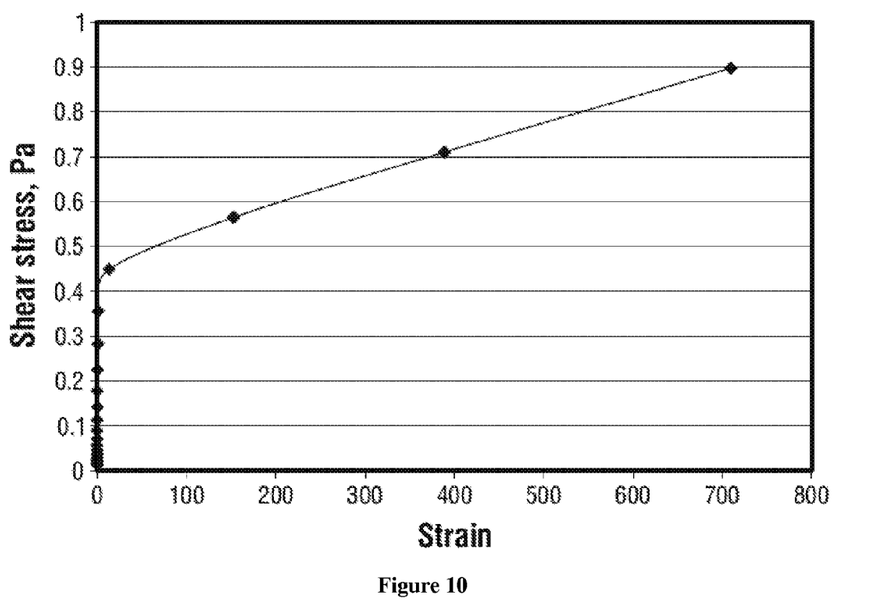
FIG. 10 is a stress-strain plot depicting effect of calcium hydroxide on the rheological behavior of a silica-fume suspension in water.

To determine if the suspension demonstrated a yield stress, a stress ramp was performed increasing the shear stress from 0.01 to 1.0 Pa over 100 s. The shear stress plotted as a function of strain in FIG. 10. The graph indicates that the yield stress of the gel in this configuration is >0.3 Pa—there was virtually no deformation of the sample until the shear stress increased to 0.4 Pa at which point the bob began to rotate. The very low strain period corresponded to 80 s of the 100-s test.

EXAMPLE 8

The presence of TiO$_2$ particles in the silica suspension can improve adhesion strength without leading to a significant increase in viscosity.

Various amounts of TiO$_2$ were added to colloidal silica (particle size of ~8 nanometers and solids content of ~30%). The average particle size of TiO$_2$ was ≈1 micrometer. Details of the formulations are given in Table 3.

TABLE 3

Formulations of blends containing TiO$_2$ and colloidal silica.

| | Formulation | | | |
|---|---|---|---|---|
| | 1 | 2 | 3 | 4 |
| TiO$_2$ (wt %) | — | 10 | 20 | 30 |
| Colloidal silica (wt %) | 100 | 90 | 80 | 70 |
| Pv (cP) at 25° C. | 7 | 9 | 10 | 17 |
| Adhesion | Weak | Weak | Medium | Good |

First, rheology measurements were performed at 25 degC. The plastic-viscosity values, P$_v$, obtained by considering a linear dependence between shear rate and shear stress, are reported in Table 3. The results show that the presence of TiO$_2$ does not increase significantly the fluid viscosity.

To test the properties of the repaired materials, experiments were performed to evaluate the adhesive properties of the different fluid formulations. A Portland-cement core (height: 5 cm; diameter: 2.5 cm) was cut vertically into two halves. One of the surfaces was covered with a thin layer of TiO$_2$/silica fluid, and the halves were joined. For all of the formulations described in Table 3, the halves were glued together. In the case of colloidal silica alone, the adhesion was weak and the two halves could be easily pulled apart. The presence of TiO$_2$ particles enhanced the adhesion strength.

EXAMPLE 9

Colloidal silica was blended with styrene-butadiene latex (SB Latex) with a particle size lower than 165 nm, nonvolatile content of 50% and pH=8.

Rheological measurements were performed at 25° C. The plastic-viscosity values, $P_v$, obtained by considering a linear dependence between shear rate and shear stress, are reported in Table 4. The results show that the presence of latex does not increase significantly the fluid viscosity.

TABLE 4

Formulations of blends containing $TiO_2$ and styrene-butadiene latex.

| Formulation | L1 | L2 | L3 | L4 | L5 |
|---|---|---|---|---|---|
| Colloidal silica (wt %) | 100 | 90 | 80 | 60 | 50 |
| SB latex (wt %) | — | 10 | 20 | 40 | 50 |
| Pv (cP) at 25° C. | 7 | 7 | 7 | 8 | 10 |
| Adhesion | Weak | Good | Good | Good | Good |

To test the properties of repaired materials, experiments were performed to evaluate the adhesive properties of the different fluid formulations. A Portland-cement core (height: 5 cm; diameter: 2.5 cm) was cut vertically into two halves. One of the surfaces was covered with a thin layer of SB Latex/silica fluid, and the halves were joined. For all of the formulations described in Table 4, the halves were glued together. However, in the case of colloidal silica alone the adhesion was weak and the two halves could be easily pulled apart. The presence of the latex enhanced the adhesion strength.

Although various embodiments have been described with respect to enabling disclosures, it is to be understood the invention is not limited to the disclosed embodiments. Variations and modifications that would occur to one of skill in the art upon reading the specification are also within the scope of the invention, which is defined in the appended claims.

We claim:

1. A method of servicing a cemented wellbore in contact with a subterranean formation, comprising:
   (i) pumping a sealant composition comprising a silica-particle suspension with no intrinsic cementitious properties into voids into or adjacent to a damaged cement sheath; and
   (ii) allowing the sealant to react with the cement sheath to form a seal,
   wherein the cement sheath provides multivalent ions to initiate gelling and setting of the composition, and the suspension pH is between about 5 and about 11.

2. The method of claim 1, wherein the cement sheath comprises Portland cement, a lime/silica blend, a lime/pozzolan blend, calcium aluminate cement, Sorel cement, chemically bonded phosphate ceramic, or geopolymer, or combinations thereof.

3. The method of claim 1, wherein the silica particles comprise colloidal silica, fumed silica, or both.

4. The method of claim 1, wherein the average silica-particle size ($d_{50}$) is less than or equal to one micrometer.

5. The method of claim 1, wherein the silica-particle suspension further comprises a latex, titanium dioxide, manganese tetraoxide or combinations thereof, wherein the average particle size ($d_{50}$) is less than or equal to one micrometer.

6. The method of claim 1, wherein the composition further comprises a pH buffer.

7. The method claim 1, wherein the composition further comprises a chloride salt at a concentration below about 0.2 molar.

8. The method of claim 1, wherein the composition further comprises a multivalent-cation sequestering agent.

9. The method of claim 8, wherein the multivalent-cation sequestering agent is an amine, an amine derivative, or both.

10. The method of claim 1, further comprising pumping a spacer fluid ahead of the silica suspension, the spacer fluid comprising a pH buffer, soluble salts, multivalent-ion sequestering agents, or combinations thereof.

* * * * *